United States Patent
Rastegar

[19]

[11] Patent Number: 6,082,072
[45] Date of Patent: Jul. 4, 2000

[54] STRUCTURAL ELEMENTS

[75] Inventor: Jahangir S. Rastegar, Stony Brook, N.Y.

[73] Assignee: The Research Foundation of State University of New York, Albany, N.Y.

[21] Appl. No.: 09/177,137

[22] Filed: Oct. 21, 1998

Related U.S. Application Data

[62] Division of application No. 08/934,402, Sep. 19, 1997.

[51] Int. Cl.⁷ ...................................................... E04C 3/02
[52] U.S. Cl. .......................... 52/729.2; 52/167.3; 428/598
[58] Field of Search ................................ 52/729.1, 729.2, 52/733.3, 167.3; 428/598, 625

[56]         References Cited

U.S. PATENT DOCUMENTS

| | | | |
|---|---|---|---|
| 2,166,798 | 7/1939 | Cote | 52/729.1 |
| 3,088,561 | 5/1963 | Ruzicka | 52/729.1 |
| 3,487,518 | 1/1970 | Hopfeld | 52/729.1 |
| 3,913,290 | 10/1975 | Billing et al. | 52/729.1 |
| 4,019,301 | 4/1977 | Fox | 52/729.1 |
| 4,425,980 | 1/1984 | Miles . | |
| 4,566,231 | 1/1986 | Konesevich . | |
| 4,615,157 | 10/1986 | Murray . | |
| 4,699,243 | 10/1987 | Enoki . | |
| 4,954,375 | 9/1990 | Sattinger et al. . | |
| 5,030,490 | 7/1991 | Bronowicki et al. . | |
| 5,285,616 | 2/1994 | Tripp | 52/729.1 |
| 5,308,675 | 5/1994 | Crane et al. . | |
| 5,473,122 | 12/1995 | Kodiyalam et al. . | |
| 5,474,840 | 12/1995 | Landin . | |

*Primary Examiner*—Michael Safavi
*Attorney, Agent, or Firm*—Scully, Scott, Murphy & Presser

[57]         ABSTRACT

A structural I-beam formed of upper and lower surfaces with a means connecting the upper surface to the lower surface. The beam has a plurality of structural elements placed along the upper as well as lower surface. Each of the structural elements themselves having both compressive and tensile structural elements formed as a unit adjacent one to the other. The compressive structural element of the structural element serving to dampen any compressive forces acting on the upper surface of the beam while the tensile structural element of the structural element serving to dampen any tensile forces acting on the lower surface of the beam. The structural elements having a first enclosure forming the compressive structural element with a first non-compressible material disposed within the first enclosure. The structural elements having a second enclosure forming the tensile structural element with a second non-compressible material disposed within the second enclosure. The walls of the structural elements are configured for optimum rigidity or optimum damping.

7 Claims, 17 Drawing Sheets

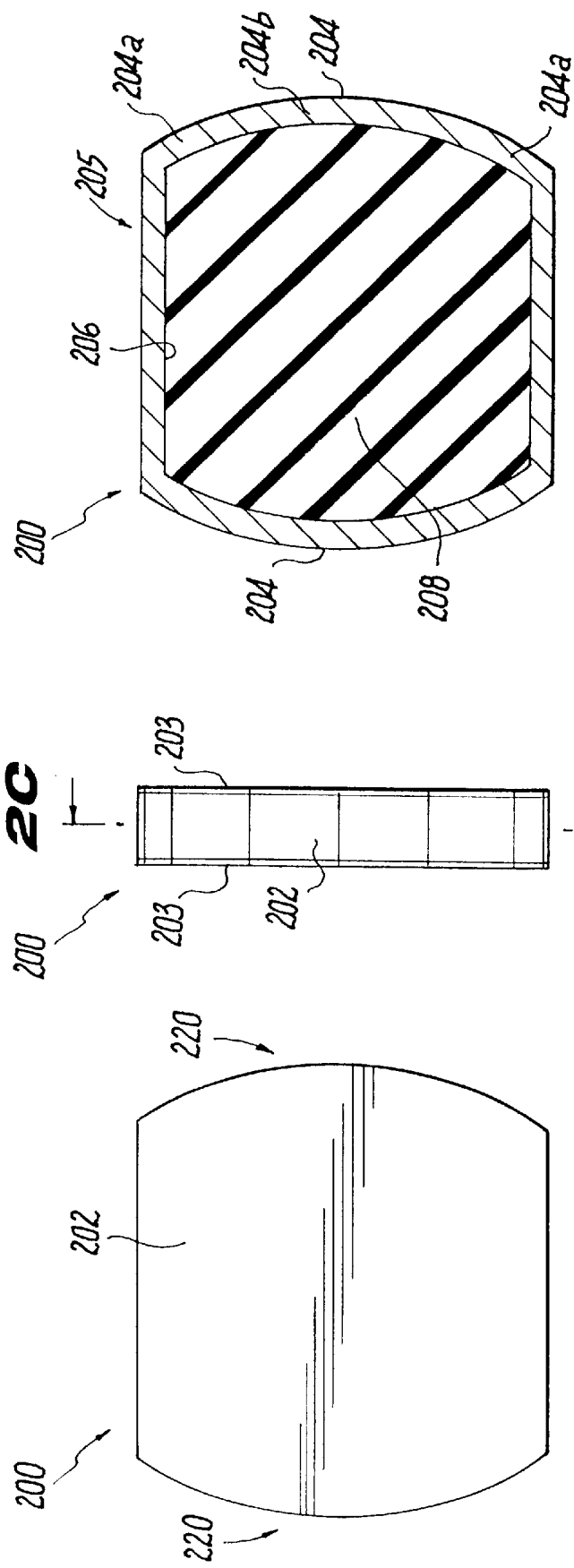

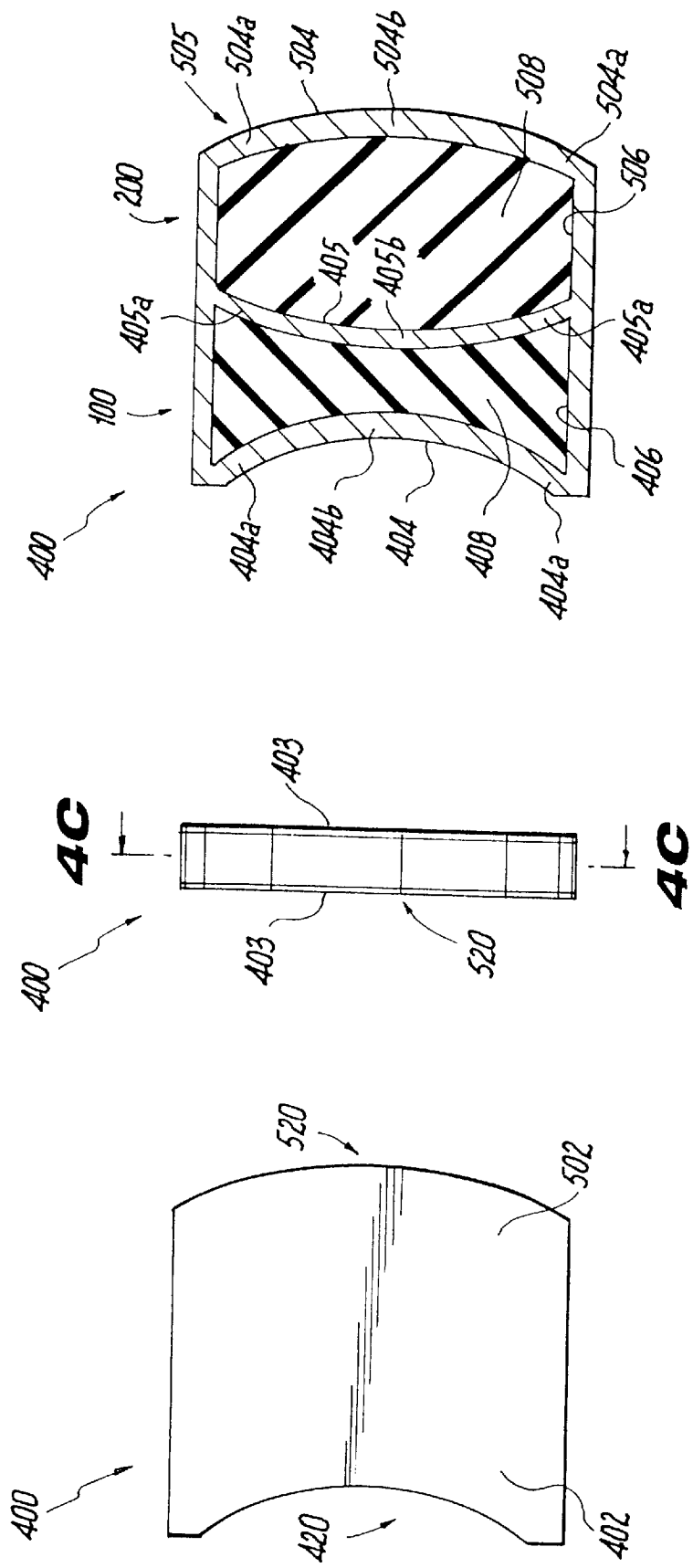

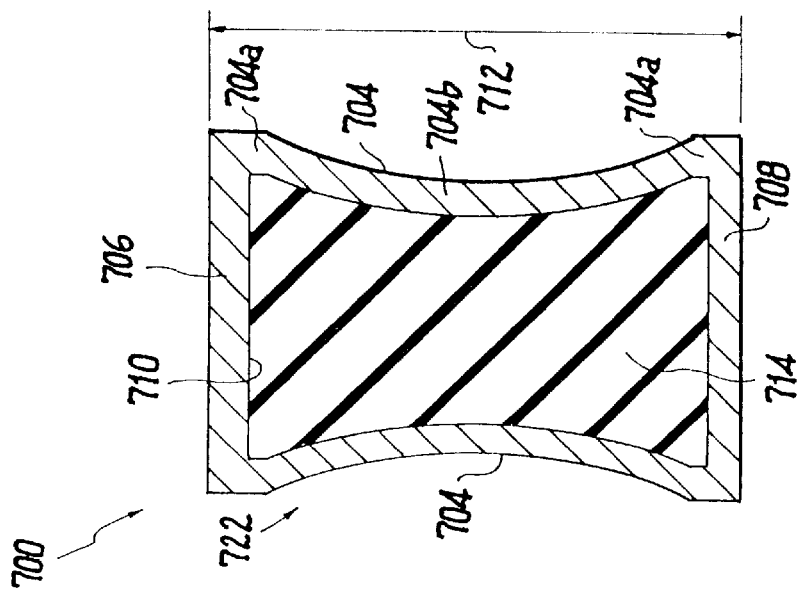
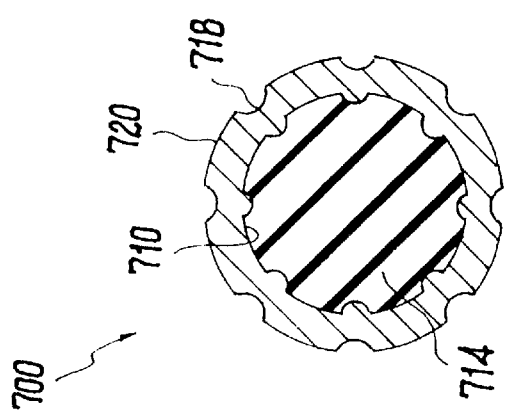
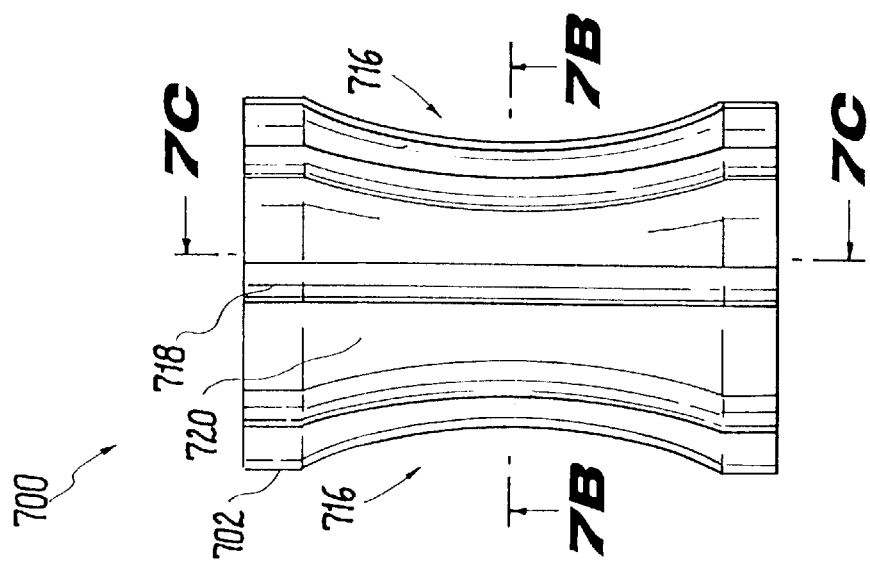
Fig. 7C
Fig. 7B
Fig. 7A

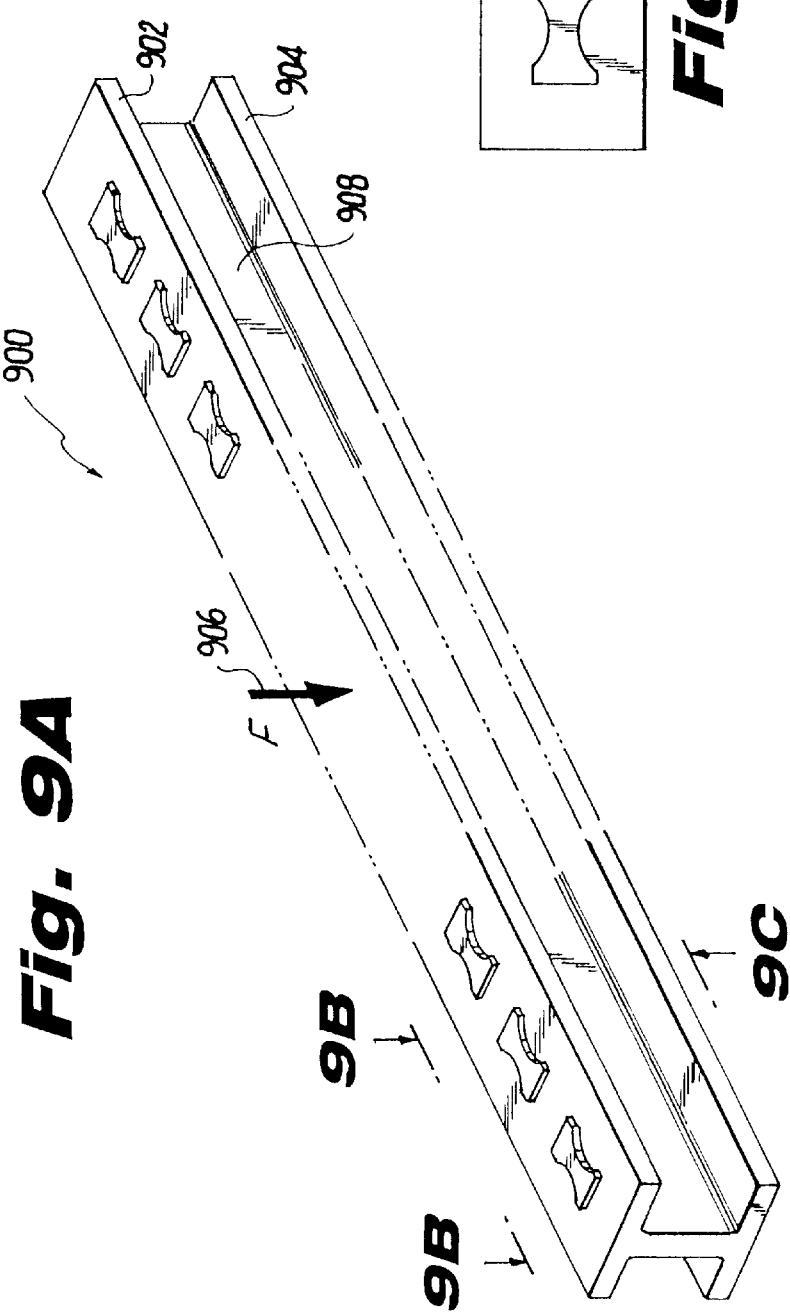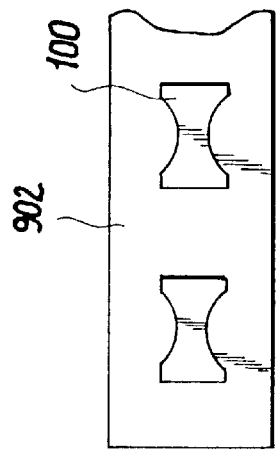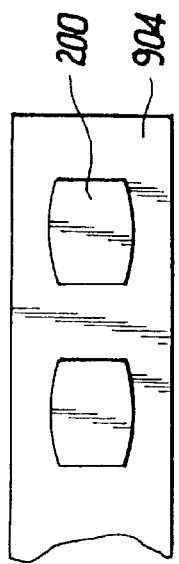

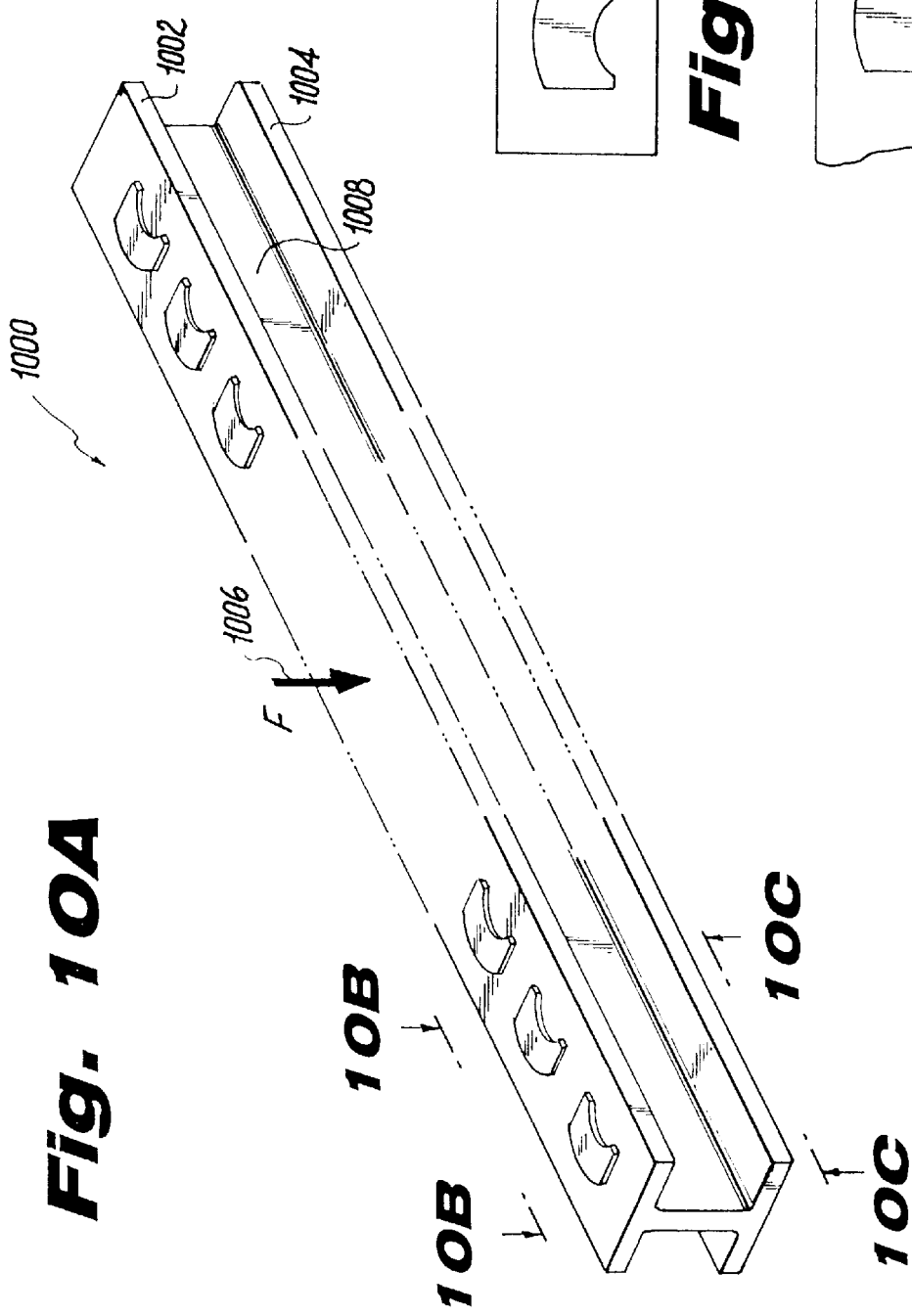
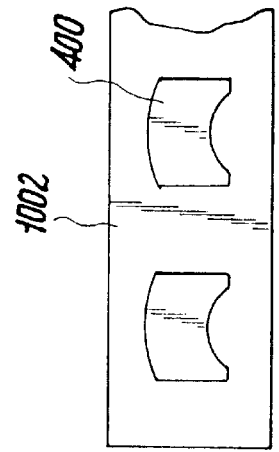
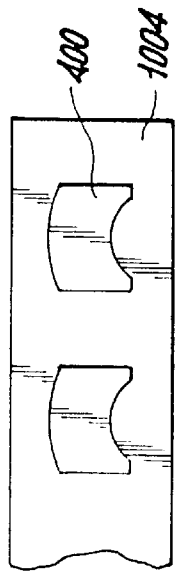

STRUCTURAL ELEMENTS

This application is a division of co-pending appliction Ser. No. 08/934,402, filed Sep. 19, 1997.

BACKGROUND OF THE INVENTION

1. Field of the Invention

The field of art to which this invention relates is structural elements, and more particularly to lightweight structural elements having a cavity in which a non-compressible material is disposed resulting in a rigid structure and/or one capable of vibration damping.

2. Description of the Related Art

It is highly desirable to build high speed machinery which are very accurate with structural elements that are light weight, have a high degree of stiffness, and have high internal damping characteristics. This is in fact the case for any product that is subjected to internally and/or externally induced vibrational excitation. With such structural elements, one can then design machines, structures, and other similar devices that are very accurate, that are lighter, and that can operate at higher speeds. This leads to a significant increase in performance.

In the prior art, when vibration becomes a factor, designers had the option of either adding various combinations of mass and viscoelastic material to the structure to employ a passive damper or employ some type of active damping device, such as a piezoelectric device. While the prior art passive damping devices have their advantages, they suffer from the disadvantage of greatly increasing the weight of the structure. This results in a reduction in the attainable speed of the machine or device. Active dampers, on the other hand, are usually lighter but greatly increase the cost of the machine as well as the cost of its operation.

For the above reasons, there is a need in the art for a low weight, low cost structural element that is very rigid and has high internal damping.

SUMMARY OF THE INVENTION

Therefore, it is an object of the present invention to provide a light weight structural element.

It is a further object of the present invention to provide a low cost structural element.

It is yet a further object of the present invention to provide a light weight structural element that provides for increased rigidity over comparable weight structural elements.

It is still yet a further object of the present invention to provide a structural element that is light weight and has high internal damping.

Accordingly, structural elements are disclosed, wherein a first embodiment has an enclosure having walls surrounding a cavity, and a non-compressible material disposed in the cavity. The walls are shaped such that a force tending to compress the element by a first deflection causes an amplified second deflection of the walls into the non-compressible material. The second deflection exerts a compressive force against the non-compressible material, resulting in a resistance to the first deflection and the force tending to compress the element.

In a second embodiment, the structural element has an enclosure having walls surrounding a cavity, and a non-compressible material disposed in the cavity. The walls are shaped such that a force tending to elongate the element by a first deflection causes an amplified second deflection of the walls into the non-compressible material. The second deflection exerts a compressive force against the non-compressible material, resulting in a resistance to the first deflection and the force tending to elongate the element.

In a third embodiment, the structural elements of the first and second embodiments are combined where a first enclosure having first walls surrounding a first cavity is provided. A second enclosure having second walls surrounding a second cavity is also provided. The structural element further has a first noncompressible material disposed in the first cavity, and a second non-compressible material disposed in the second cavity. The first walls are shaped such that a first force tending to compress the element by a first deflection causes an amplified second deflection of the first walls into the first non-compressible material, exerting a first compressive force against the first non-compressible material, resulting in a resistance to the first deflection and the first force tending to compress the element. The second walls are shaped such that a second force tending to elongate the element by a third deflection causes an amplified fourth deflection of the second walls into the second non-compressible material, exerting a second compressive force against the second non-compressible material, resulting in a resistance to the third deflection and the second force tending to elongate the element.

In a fourth embodiment of the present invention the structural element of the first embodiment is configured into a cylindrical enclosure having a wall, a top, a bottom, and a cavity defined by the wall, top and bottom, the top and bottom being separated by a height. The structural element further having a non-compressible material disposed in the cavity. The wall is concavely shaped such that a first compressive force tending to decrease the height causes an amplified deflection of the wall into the non-compressible material, exerting a second compressive force against the non-compressible material, resulting in a resistance to the amplified deflection and the first compressive force.

In a fifth embodiment of the present invention the structural element of the second embodiment is configured similarly to the fourth embodiment except that the wall is convexly shaped such that a tensile force tending to increase the height of the structural element causes an amplified deflection of the wall into the non-compressible material, exerting a compressive force against the non-compressible material, resulting in a resistance to the amplified deflection and the tensile force.

In variations of the fourth and fifth embodiments, the wall comprises a plurality of panels, the panels being separated by a flectural joint for aiding the deflection of the wall into the non-compressible material.

In variations of the above embodiments, the structural elements are configured for either optimum damping or optimum rigidity or a combination of rigidity and damping.

In yet other variations of the above embodiments, the structural elements are disposed on, or in, structural beams configured for either optimum damping, optimum rigidity, or a combination of rigidity and damping.

In yet other variations of the above embodiments, the structural elements are disposed on, or in, motion impartation devices configured for either optimum damping, optimum rigidity, or a combination of rigidity and damping.

Another aspect of the present invention are methods of fabricating the structural beam embodiments of the present invention.

BRIEF DESCRIPTION OF THE DRAWINGS

These and other features, aspects, and advantages of the apparatus and methods of the present invention will become better understood with regard to the following description, appended claims, and accompanying drawings where:

FIG. 2A illustrates a front view of a second embodiment of the present invention;

FIG. 2B illustrates a side view of the embodiment of FIG. 2A;

FIG. 2C illustrates a sectional view of the embodiment of FIG. 2B taken along line 2C—2C;

FIG. 4A illustrates a front view of a third embodiment of the present invention;

FIG. 4B illustrates a side view of the embodiment of FIG. 4A;

FIG. 4C illustrates a sectional view of the embodiment of FIG. 4B taken along line 4C—4C;

FIG. 7A illustrates a front view of a fourth embodiment of the present invention;

FIG. 7B illustrates a sectional view of the embodiment of FIG. 7A taken along line 7B—7B;

FIG. 7C illustrates a sectional view of the embodiment of FIG. 7A taken along line 7C—7C;

FIG. 9A illustrates an isometric view of a structural beam wherein structural elements of the first and second embodiments are disposed along its upper and lower surfaces;

FIG. 9B illustrates a partial view of FIG. 9A as viewed along line 9B—9B;

FIG. 9C illustrates a partial view of FIG. 9A as viewed along line 9C—9C:

FIG. 10A illustrates an isometric view of a structural beam wherein structural elements of the third embodiment are disposed along its upper and lower surfaces;

FIG. 10B illustrates a partial view of FIG. 10A as viewed along line 10B—10B;

FIG. 10C illustrates a partial view of FIG. 10A as viewed along line 10C—10C:

DETAILED DESCRIPTION OF THE PREFERRED EMBODIMENTS

Figure 1A:
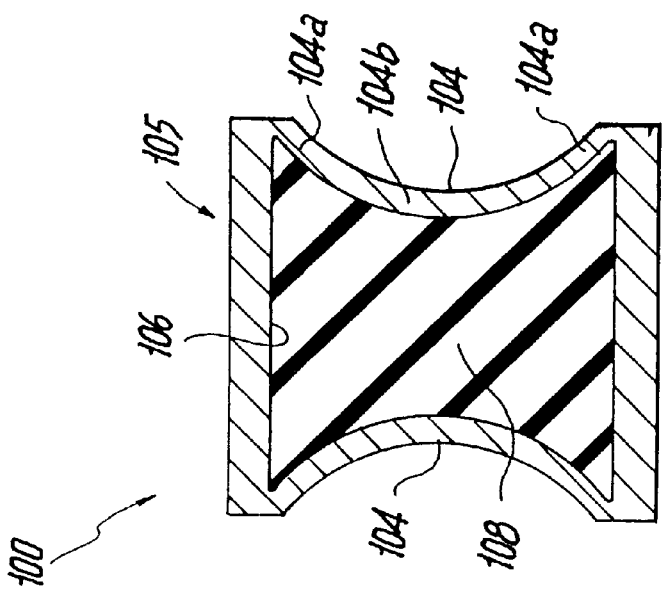
FIG. 1A illustrates a front view of a first embodiment of the present invention.
Figure 1B:
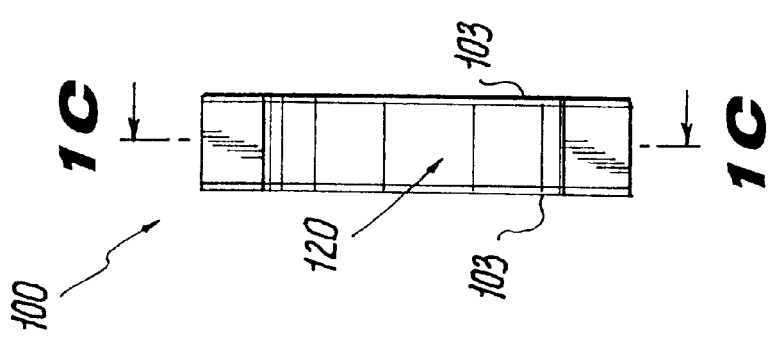
FIG. 1B illustrates a side view of the embodiment of FIG. 1A.
Figure 1C:
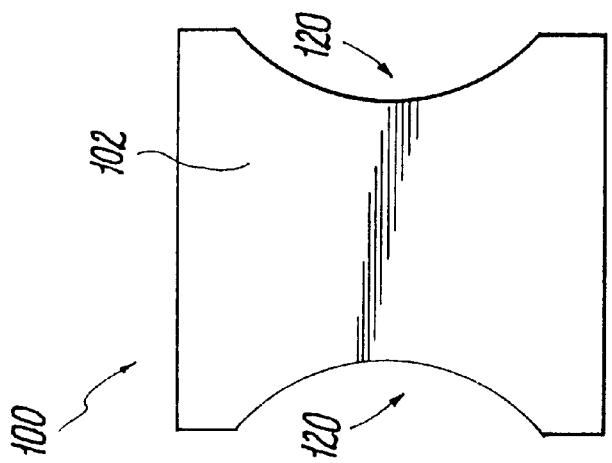
FIG. 1C illustrates a sectional view of the embodiment of FIG. 1B taken along line 1C—1C.

Referring now to FIGS. 1A, 1B, 1C, and 3A, there is illustrated a first embodiment of the present invention, namely, a compressive structural element referred to generally by reference numeral 100. The compressive structural element 100 has an enclosure 102 having walls 103, 104 and defining a cavity 106. Walls 104 are preferably formed by extruding the structural element's cross-sectional profile 105, as shown in FIG. 1C. Walls 103 are preferably plates, formed by conventional methods, such as stamping, and fastened to the cross-sectional profile by conventional methods, such as welding. However, walls 103 and 104 can be an integral piece forming the enclosure 102.

Disposed in the cavity 106 is a non-compressible material 108. The non-compressible material is preferably an elastomer, a liquid or a combination of elastomer and liquid. The non-compressible material, if an elastomer, is preferably disposed in a length of extrusion having the cross-sectional profile 105 where individual compressive structural elements 100 are sliced from the extrusion as a predetermined thickness.

Figure 3A:
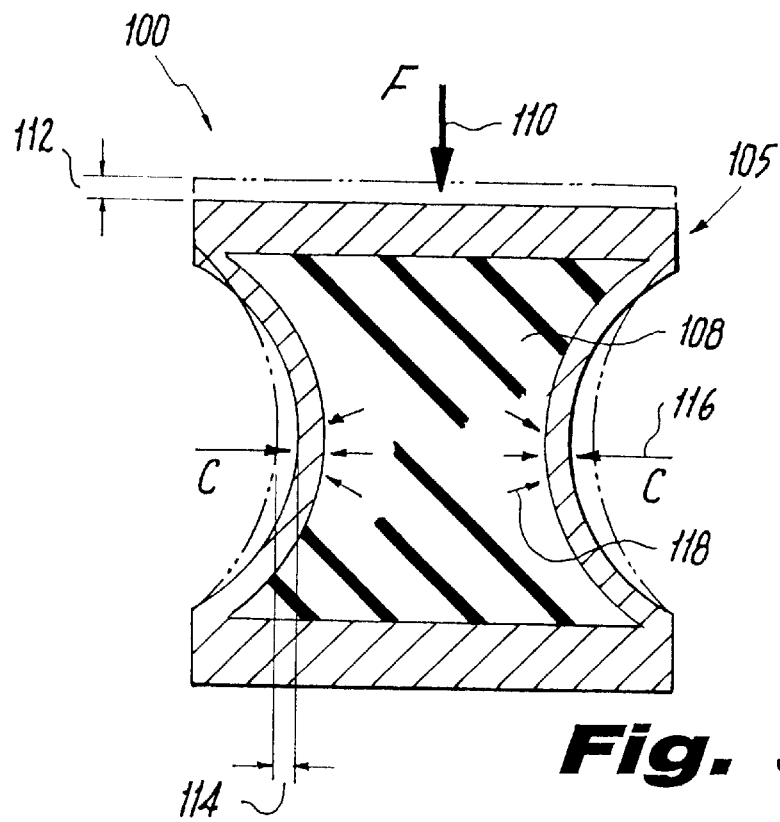
FIG. 3A illustrates the sectional view of FIG. 1C deflecting under a compressive force.

The walls 104 are shaped such that a first compressive force 110, shown in FIG. 3A, tends to compress the structural element 100 by a first deflection 112 which causes an amplified second deflection 114 of the walls 104 into the non-compressible material 108. The relaxed position of the compressive structural element 100 (i.e., where no compressive force 110 is present) is shown in FIG. 3A as dashed lines. The walls 104 thereupon exert a second compressive force 116 against the non-compressible material 108 disposed in the cavity 106. Being non-compressible, the non-compressible material 108, resists the second compressive force with a resistive force 118 resulting in a resistance to the first deflection 112 and the first compressive force 110.

In order to optimize the amplification of the second deflection 114, the walls are preferably concavely shaped 120 into the cavity 106. Furthermore, the walls can be configured to provide optimum damping, optimum rigidity, or a combination of the two depending upon the application. For instance, as shown in FIGS. 1C and 3A, the walls 104 can be of uniform thickness where the end portions 104a are of substantially the same thickness as the center portion 104b. This configuration causes minimal migration of the non-compressible material 108 due to the second compressive force 116 resulting in a compressive structural element 100 which provides for some damping and high rigidity.

Figure 6A:
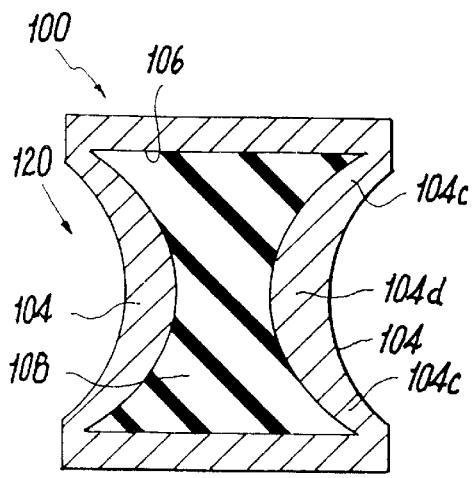
FIGS. 6A, 6B, and 6C illustrate versions of the first three embodiments, respectively, having a non-uniform wall thickness.

Alternatively, as shown in FIG. 6A, the walls 104 can be configured such that the center portion 104d is substantially thicker than at the end portions 104c. This configuration results in increased migration of the non-compressible material 108 due to the second compressive force 116 resulting in a compressive structural element 100 which provides some rigidity and high damping. It is appreciated by someone skilled in the art that the wall configuration can be varied to produce differing degrees of desired damping and rigidity based upon the requirements of the application at hand.

It is also appreciated by someone skilled in the art that different non-compressible materials, or combinations of non-compressible materials will produce differing degrees of desired damping and rigidity based upon the requirements of the application at hand. For instance, a hard elastomer will produce a more rigid structural element 100 with little damping, while a softer elastomer will produce a less rigid structural element 100 with higher damping. Combining an elastomer with a liquid will result in still other possibilities regarding damping and rigidity.

Referring now to FIGS. 2A, 2B, 2C, and 3B, there is illustrated a second embodiment of the present invention, namely, a tensile structural element referred to generally as reference numeral 200 and being similar to the compressive structural element 100 except for the element's loading and wall configuration to provide damping and rigidity in response to the loading. The tensile structural element 200 has an enclosure 202 having walls 203, 204 and defining a cavity 206. Walls 204 are again preferably formed by extruding the structural element's cross-sectional profile 205, as shown in FIG. 2C. Walls 203 are preferably plates, formed by conventional methods, such as stamping, and fastened to the cross-sectional profile by conventional methods, such as spot welding. However, walls 203, 204 can be an integral piece forming the enclosure 202.

Figure 3B:
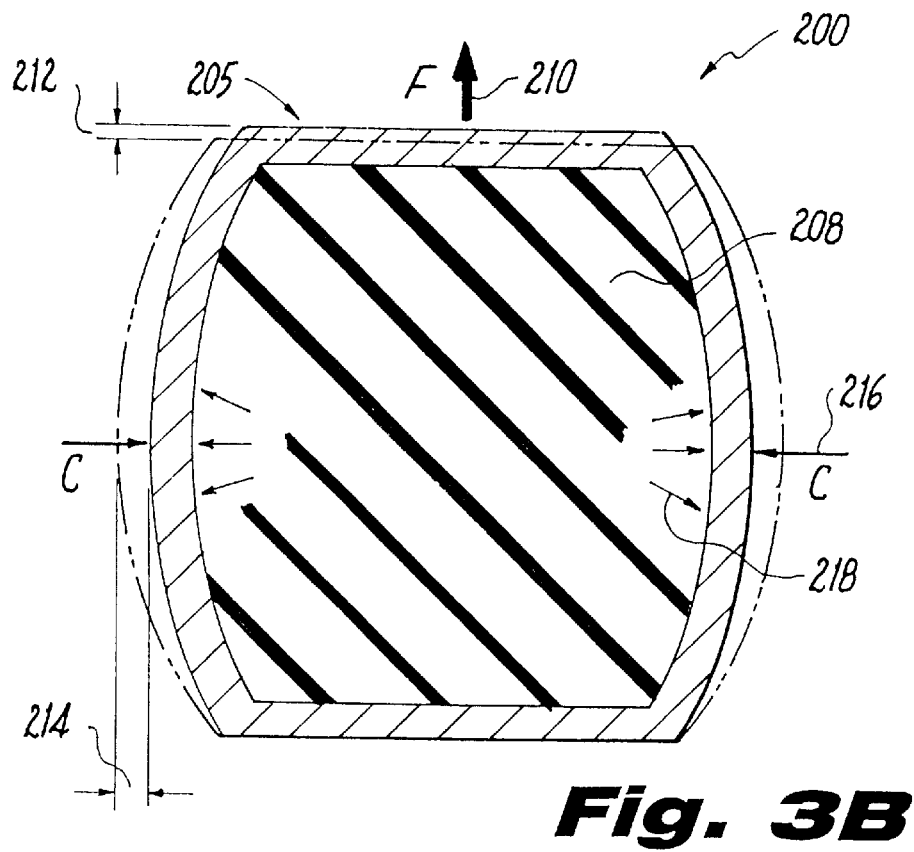
FIG. 3B illustrates the sectional view of FIG. 2C deflecting under a tensile force.

Disposed in the cavity 206 is a non-compressible material 208. As with the compressive structural element 100, the non-compressible material 208 of the tensile compressive element 200 is preferably an elastomer, a liquid or a combination of elastomer and liquid. The walls 204 are shaped such that a tensile force 110, shown in FIG. 3B, tends to elongate the structural element 200 by a first deflection 212 which causes an amplified second deflection 214 of the walls 204 into the non-compressible material 208. The relaxed position of the tensile structural element 200 (i.e., where no tensile force is present) is shown in FIG. 3B as dashed lines. The walls 204 thereupon exert a compressive force 216 against the non-compressible material 208 disposed in the cavity 206. Being non-compressible, the non-compressible material 208, resists the compressive force 216 with a resistive force 218 resulting in a resistance to the first deflection 212 and the tensile force 210.

In order to optimize the amplification of the second deflection 214, the walls are preferably convexly shaped 220 away from the cavity 206. As discussed previously with regard to the compressive structural element 100, the walls 204 can be configured to provide optimum damping, optimum rigidity, or a combination of the two depending upon the application. For instance, as shown in FIGS. 2C and 3B, the walls 204 can be of uniform thickness where the end portions 204a art of substantially the same thickness as the center portion 204b. As discussed previously, this configuration provides for some damping and high rigidity.

Figure 6B:
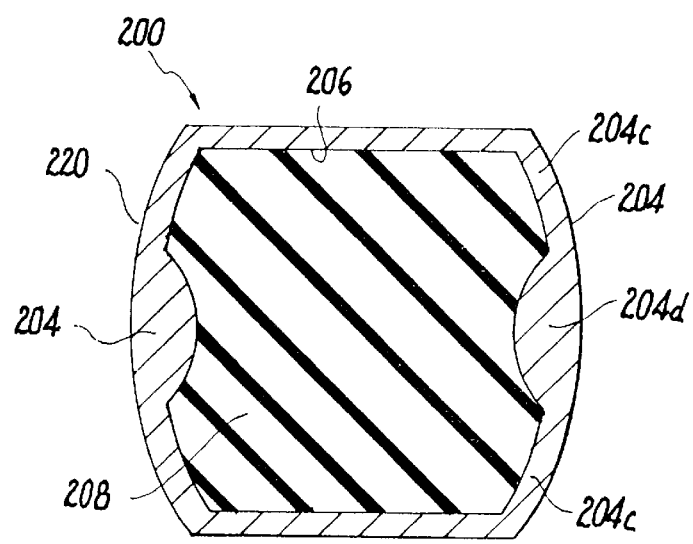

Alternatively, as shown in FIG. 6B, the walls 204 can be configured such that the center portion 204d is substantially thicker than at the end portions 204c. This configuration results in some rigidity and high damping. As discussed above, it is appreciated by someone skilled in the art that the wall configuration can be varied to produce differing degrees of desired damping and rigidity based upon the requirements of the application at hand.

As also discussed above, it is also appreciated by someone skilled in the art that different non-compressible materials, or combinations of non-compressible materials will also produce differing degrees of desired damping and rigidity based upon the requirements of the application at hand.

In a third embodiment of the present invention, shown in FIGS. 4A, 4B, 4C, 5A, and 5B, the structural elements of the first and second embodiments are combined resulting in structural element 400. The structural element 400 has a compressive and a tensile structural element 100, 200, respectively. The compressive structural element 100 has a first enclosure 402 having first walls 403, 404, and 405 and defining a first cavity 406. The tensile structural element 200 has a second enclosure 502 having second walls 403, 504, and 405 and defining a second cavity 506.

The first and second walls 404, 504, and 405 are preferably integrally formed by extruding the structural element's cross-sectional profile 505, as shown in FIG. 4C. First and second walls 403 are also preferably integrally formed as plates, by conventional methods, such as stamping, and fastened to the cross-sectional profile by conventional methods, such as welding.

Disposed in the first and second cavities 406, 506 are non-compressible materials 408, 508. The non-compressible materials are preferably an elastomer, a liquid or a combination of elastomer and liquid. The first walls 404, 405 are shaped such that a first force 410, shown in FIG. 5A, tending to compress the structural element 400 by a first deflection 412 causes an amplified second deflection 414 of the first walls 404, 405 into the first non-compressible material 408. The first walls 404, 405 thereupon exert a first compressive force 416 against the first non-compressible material 408 disposed in the first cavity 406. Being non-compressible, the first non-compressible material 408, resists the first compressive force 416 with a resistive force 418 resulting in a resistance to the first deflection 412 and the first force 410.

Figure 5A:
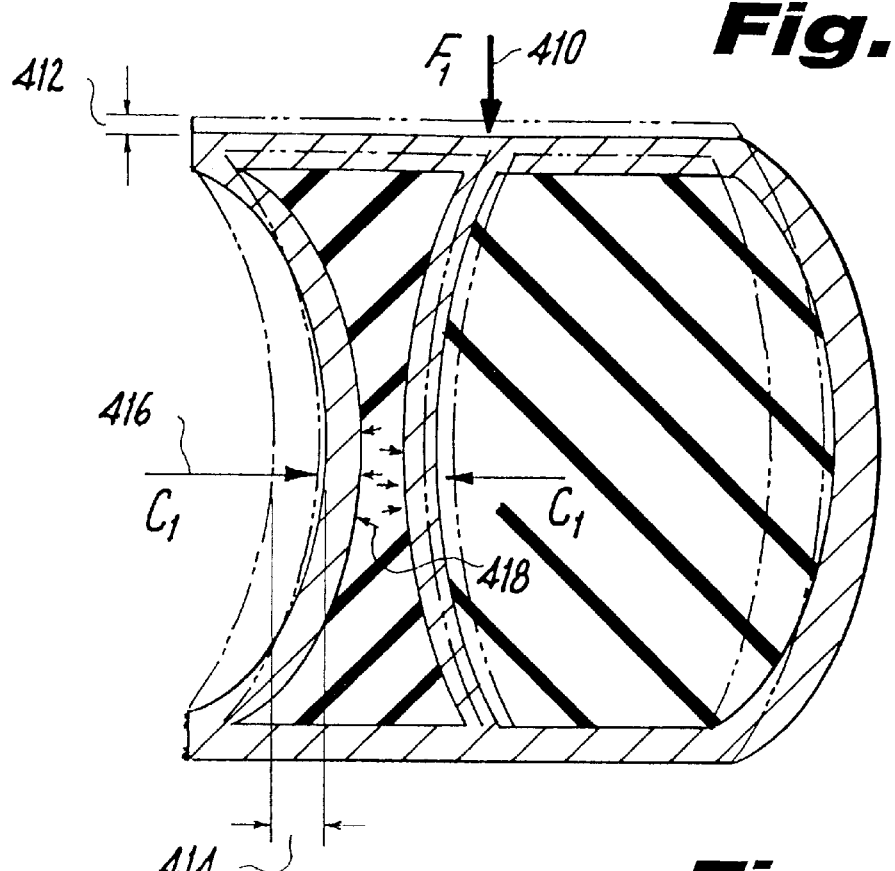
FIG. 5A illustrates the sectional view of FIG. 4C deflecting under a compressive force.
Figure 5B:
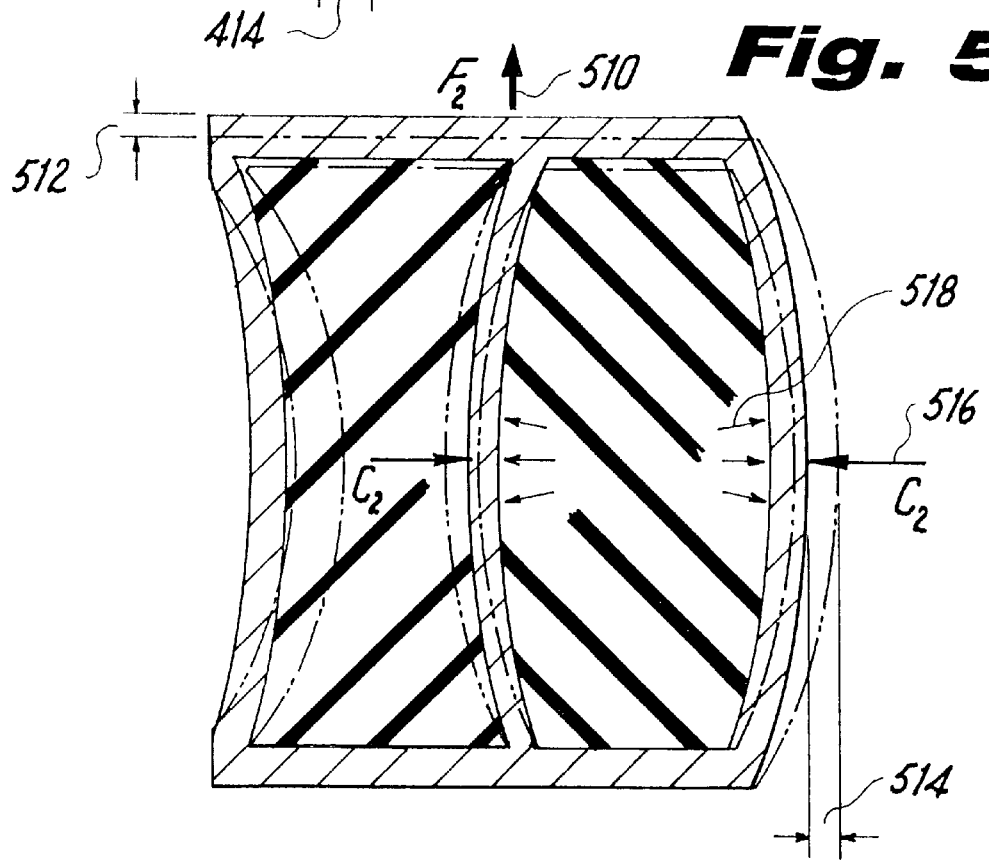
FIG. 5B illustrates the sectional view of FIG. 4C deflecting under a tensile force.

The second walls 504, 405 are shaped such that a second force 510, shown in FIG. 5B, tending to elongate the structural element 400 by a third deflection 512 causes an amplified fourth deflection 514 of the second walls 504, 405 into the second non-compressible material 508. The second walls 504, 405 thereupon exert a second compressive force 516 against the second non-compressible material 508 disposed in the second cavity 506. Being non-compressible, the second non-compressible material 508, resists the second compressive force 516 with a resistive force 518 resulting in a resistance to the third deflection 512 and the second force 510.

Therefore, while in compression due to the first force 410 the structural element 400 acts as does the compressive structural element 100. While in tension due to the second force 510, the structural element 400 acts as does the tensile structural element 200.

In order to optimize the amplification of the second deflection 414, the first walls are preferably concavely shaped 420 into the first cavity 406. Similarly, in order to optimize the amplification of the fourth deflection 514, the second walls are preferably convexly shaped 520 away from the second cavity 506. In the preferred configuration shown in FIG. 4C one of the first walls surrounding the first cavity 406 also comprises one of the second walls surrounding the second cavity 506 resulting in a shared wall 405.

Furthermore, as discussed above with regard to the compressive and tensile structural elements 100, 200 the walls and non-compressible materials can be configured to provide optimum damping, optimum rigidity, or a combination of the two depending upon the application. However, the combined structural element 400 can be configured for differing characteristics for resistance to tensile forces and compressive forces. For instance, the structural element can be configured to provide optimum rigidity and low damping in response to a compressive force, and high damping and low rigidity in response to a tensile force.

Figure 6C:
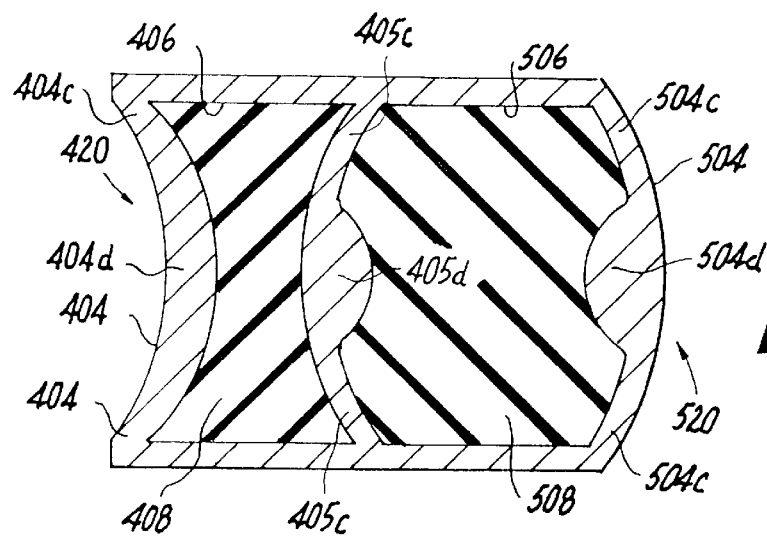

Configuration of the structural element 400 is achieved as discussed above by providing uniform wall thickness 404a, 404b, 504a, 504b, as shown in FIG. 4C, by providing varying wall thickness 404c, 404d, 504c, 504d, as shown in FIG. 6C, and/or by varying the types of non-compressible materials as well as their characteristics.

Referring now to FIGS. 7A, 7B, and 7C there is shown a fourth embodiment of the present invention generally referred to as reference numeral 700 which is similar to the compressive structural element 100 except that the compressive structural element 700 is cylindrical in shape. The compressive structural element 700 has a cylindrical enclosure 702 having a wall 704, a top 706, a bottom 708 and a cavity 710 defined by the wall 704, top 706, and bottom 708. The top 706 and bottom 708 of the compressive structural element 700 are separated by a height 712. The compressive structural element 700 also having a non-compressible material 714 disposed in the cavity 710.

The wall 704 preferably comprises a plurality of panels 720 separated by flectural joints 718 for aiding the deflection of the wall 704 into the cavity 710. The flectural joints are preferably "in-turned" portions running longitudinally to the structural elements height. Also, the wall 704, top 706, and bottom 708 preferably comprise an integral metal shell 722. However, it is appreciated by someone skilled in the art that any suitable material can be utilized without departing from the scope and spirit of the invention.

The operation of compressive element 700 in response to a first compressive force will now be explained with reference to FIG. 3A in which the cross-sectional profile shown for compressive structural element 100 is similar to that of compressive structural element 700, the operation of both therefore being the same. The wall 704 of compressive element 700 are concavely shaped 716 such that a first compressive force tending to decrease the height 712 causes an amplified deflection of the wall 704 into the non-compressible material 714. As a result, the wall 704 exerts a second compressive force against the non-compressible material 714, resulting in a resistance to the amplified deflection and the first compressive force.

As discussed previously, the non-compressible material is preferably an elastomer, a liquid, or a combination of elastomer and liquid. Like compressive element 100, compressive element 700 can be configured with a wall 704 for either optimum damping, optimum rigidity or any combination of the two. This is achieved as discussed previously by providing uniform wall thickness 704a, 704b, varying wall thickness (as similarly shown in FIG. 6A), and by varying the type and characteristics of the non-compressible material 714.

Figure 8C:
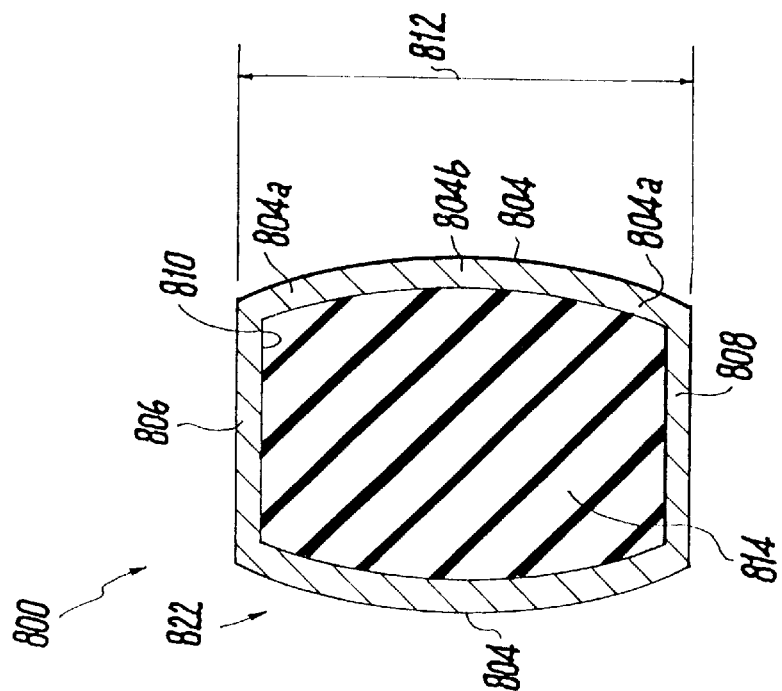
FIG. 8C illustrates a sectional view of the embodiment of FIG. 8A taken along line 8C—8C.
Figure 8B:
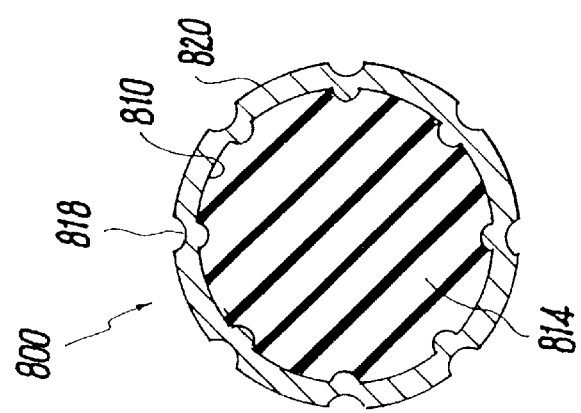
FIG. 8B illustrates a sectional view of the embodiment of FIG. 8A taken along line 8B—8B.
Figure 8A:
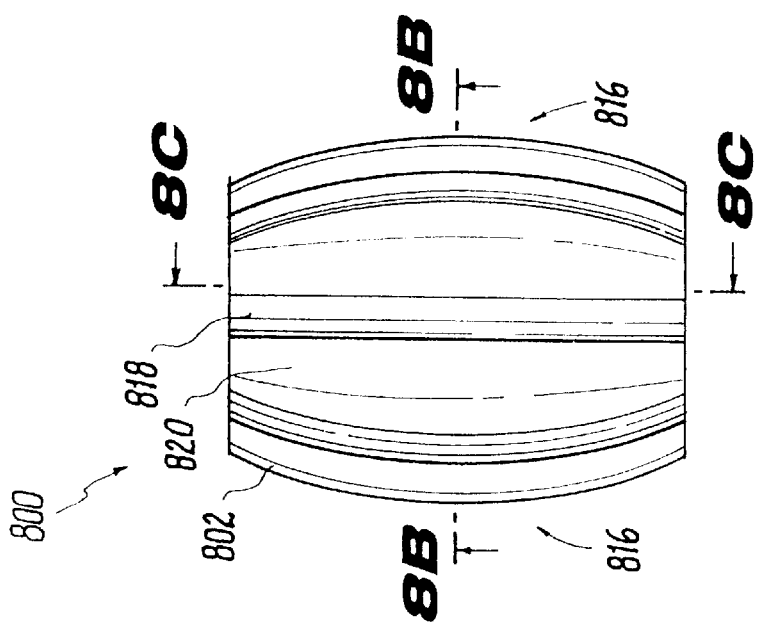
FIG. 8A illustrates a front view of a fifth embodiment of the present invention.

Referring now to FIGS. 8A, 8B, and 8C there is shown a fifth embodiment of the present invention generally referred to as reference numeral 800 which is similar to tensile structural element 200 except that compressive structural element 800 is cylindrical in shape. Compressive structural element 800 has a cylindrical enclosure 802 having a wall 804, a top 806, a bottom 808 and a cavity 810 defined by the wall 804, top 806, and bottom 808. The top 806 and bottom 808 of the compressive structural element 800 being separated by a height 812. The tensile structural element 800 also having a non-compressible material 814 disposed in the cavity 810.

The wall 804 preferably comprises a plurality of panels 820 separated by flectural joints 818 for aiding the deflection of the wall 804 into the cavity 810. The flectural joints are preferably "in-turned" portions running longitudinally to the structural element's height 812. Also, the wall 804, top 806, and bottom 808 preferably comprise an integral metal shell 822. However, it is appreciated by someone skilled in the art that any suitable material can be utilized without departing from the scope and spirit of the invention.

The operation of compressive element 800 in response to a tensile force will now be explained with reference to FIG. 3B in which the cross-sectional profile shown for tensile structural element 200 is similar to that of tensile structural element 800, the operation of both therefore being the same. The wall 804 of compressive element 800 is convexly shaped 816 such that a tensile force tending to increase the height 812 causes an amplified deflection of the wall 804 into the non-compressible material 814. As a result, the wall 804 exerts a compressive force against the non-compressible material 814, resulting in a resistance to the amplified deflection and the tensile force.

As discussed previously, the non-compressible material is preferably an elastomer, a liquid, or a combination of elastomer and liquid. Like tensile element 200, tensile element 800 can be configured with a wall 804 for either optimum damping, optimum rigidity or any combination of the two. This is achieved as discussed previously by providing uniform wall thickness 804a, 804b, varying wall thickness (as similarly shown in FIG. 6B), and by varying the type and characteristics of the non-compressible material 814.

Embodiments of the present invention which utilize the tensile and compressive structural elements 100, 200, and 400 previously discussed will now be described. Referring now to FIGS. 9A, 9B, and 9C, there is illustrated a structural beam generally referred to as reference numeral 900. The structural beam 900 has an upper surface 902 in compression and a lower surface 904 in tension due to a loading force 906. A web 908 connects the upper surface to the lower surface in a typical I-beam configuration. However, it is appreciated by someone skilled in the art that beam configurations other than that of an I-beam can be utilized without departing from the spirit and scope of the invention.

A plurality of compressive structural elements 100 are disposed along the length of the upper surface 902. A plurality of tensile structural elements 200 are disposed along the length of the lower surface 904. The structural elements 100, 200 are fastened to their respective surfaces 902, 904 by conventional methods. If the enclosures and beam are metal, the structural elements 100, 200 are preferably welded. However, any conventional fastening method can be utilized, such as epoxy bonding or fastening with screws or rivets.

The compressive structural elements 100 on the upper surface 902 and the tensile structural elements 200 on the lower surface 904 provide either damping or added rigidity to the beam as a result to their resistance to the loading force 906. As discussed previously, the structural elements 100, 200 can be configured for optimum damping, rigidity, or any combination thereof.

Referring now to FIGS. 10A, 10B, and 10C, there is illustrated a structural beam generally referred to as reference numeral 1000. The structural beam 1000, like beam 900 has an upper surface 1002 in compression and a lower surface 1004 in tension due to a loading force 1006. A web 1008 connects the upper surface to the lower surface in a typical I-beam configuration. However, it is appreciated by someone skilled in the art that beam configurations other than that of an I-beam can be utilized without departing from the spirit and scope of the invention.

A plurality of combined structural elements 400 are disposed along the length of the upper and lower surfaces 1002, 1004. As discussed previously, the structural elements 400 are fastened to the upper and lower surfaces 1002, 1004 by conventional methods.

The combined structural elements 400 on the upper and lower surfaces 1002, 1004 provide either damping or added rigidity to the beam as a result to their resistance to the loading force 906. As discussed previously, the structural elements 100, 200 can be configured for optimum damping, rigidity, or any combination thereof. However, unlike structural beam 900, structural beam 1000 is equipped to provide damping and/or added rigidity to the loading force 1006 in the direction shown, or a loading force in the opposite direction in which the upper surface 1002 is in tension and the lower surface 1004 is in compression. Structural beam 1000 therefore being more versatile than structural beam 900 which is utilized in situations where the loading force is known not to vary in direction, or where the damping and added rigidity is only desired when the loading force is in a certain direction.

Figure 11A:
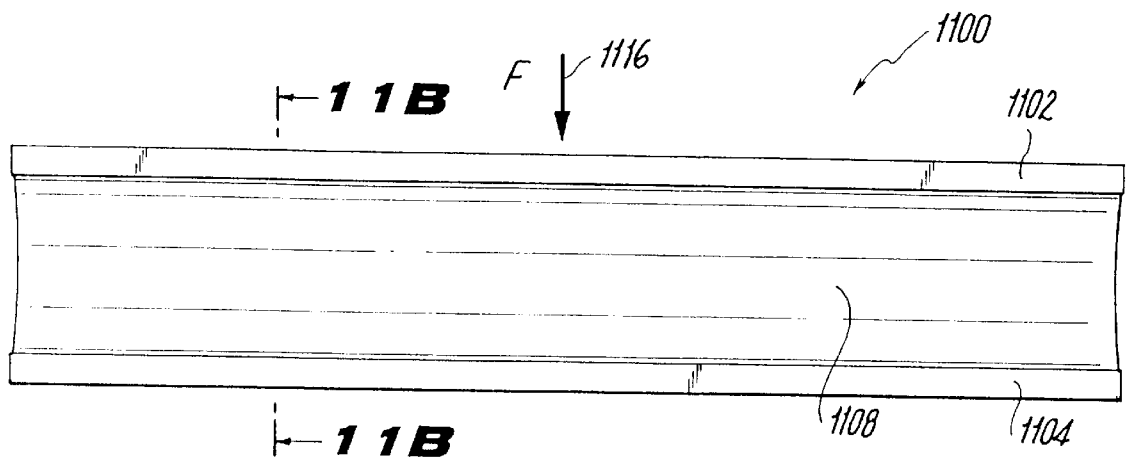
FIG. 11A illustrates a front view of a sixth embodiment of the present invention.
Figure 11B:
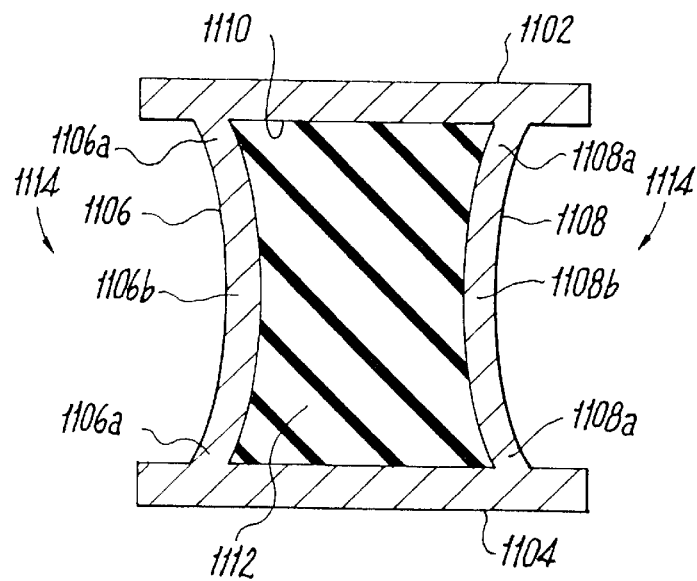
FIG. 11B illustrates a sectional view of the embodiment of FIG. 11A taken along line 11B—11B.

Referring now to FIGS. 11A and 11B there is illustrated a sixth embodiment of the present invention in which a structural beam is shown and generally referred to by reference numeral 1100. The structural beam 1100 has an upper surface 1102, a lower surface 1104 and first and second walls 1106, 1108, respectively, connecting the upper surface 1102 to the lower surface 1104. The volume between the walls 1106, 1108 define a cavity 1110 in which a non-compressible material 1112 is disposed.

The beams cross-sectional profile, shown in FIG. 11B is preferably fabricated by an extrusion process. The cavity 1110 is preferably subsequently filled with non-compressible material 1112 by any method known in the art, such as injecting an elastomer in a liquid state. As discussed previously, with regard to the other embodiments of the present invention the non-compressible material 1112 is preferably an elastomer, a liquid, or any combination thereof.

Similar to the compressive element 100, walls 1106, 1108 are shaped such that a first compressive force tending to compress the beam 1100 by a first compression causes an amplified second deflection of the walls 1106, 1108 into the non-compressible material 1112, resulting in a resistance to the first deflection and the force tending to compress the beam 1100. The force tending to compress the beam 1100 being a loading force 1116. Preferably, the beam 1100 has a typical I-Beam configuration with walls that are concavely shaped 1114 to optimize the deflection into the non-compressible material 1112.

As discussed previously with regard to the previous embodiments, the beam 1100 can be configured for optimum damping, rigidity, or a combination thereof by varying the wall thickness 1108a, 1108b and/or by varying the type and characteristics of the non-compressible material 1112.

Figure 12A:
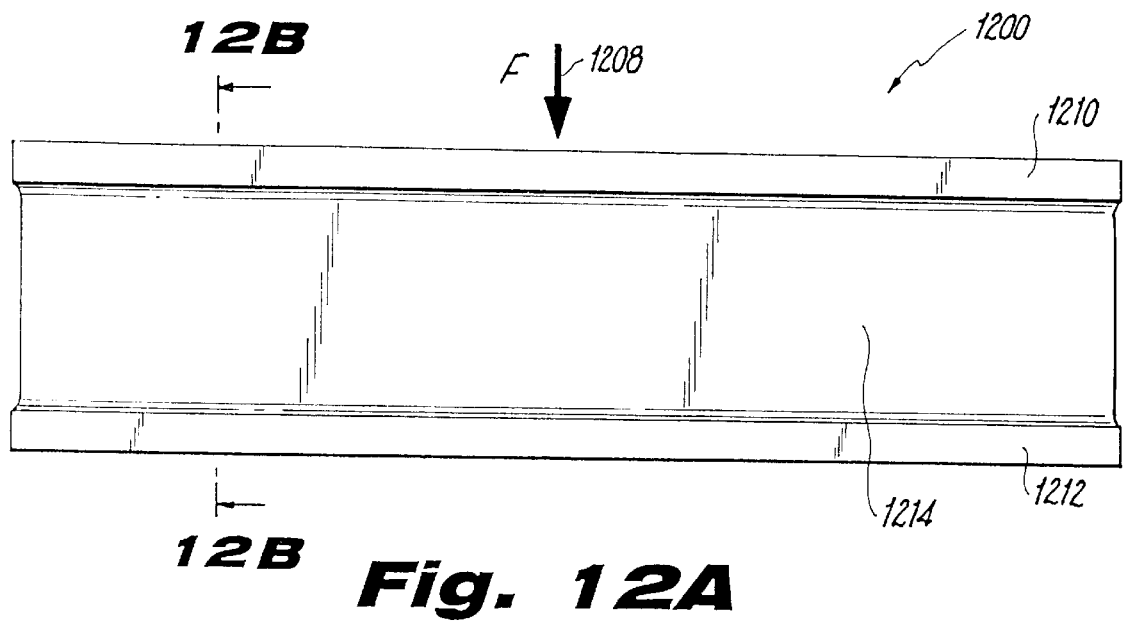
FIG. 12A illustrates a front view of a structural beam wherein structural elements of the fourth and fifth embodiments of the present invention are disposed throughout the beam's cross-sectional profile.
Figure 12B:
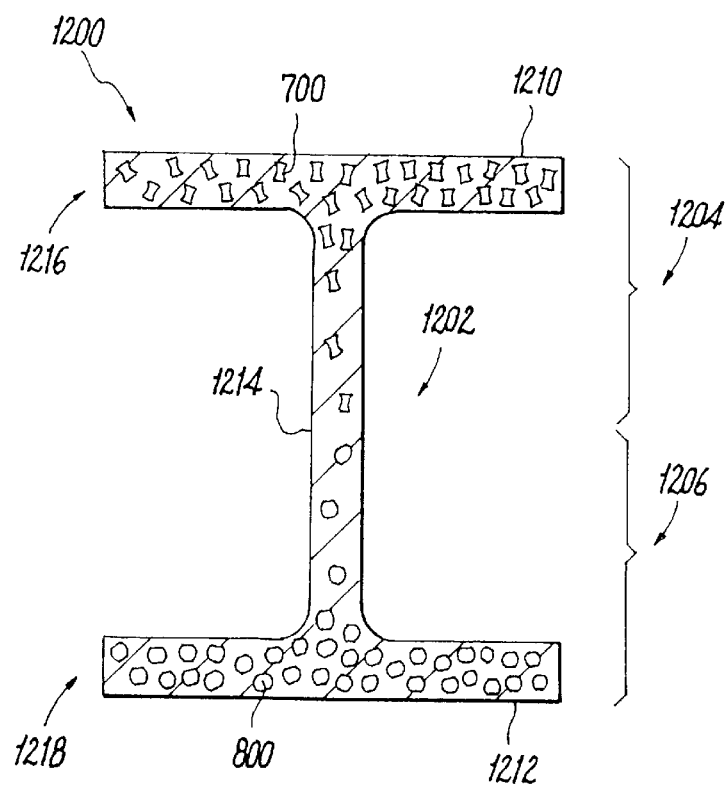
FIG. 12B illustrates a sectional view of the beam of FIG. 12A taken along line 12B—12B.

Embodiments of the present invention which utilize the tensile and compressive structural elements 700 and 800 previously described will now be described. Referring now to FIGS. 12A and 12B, there is illustrated a structural beam generally referred to by reference numeral 1200. The structural beam having a cross-sectional profile 1202, with first portions 1204 of the profile being in compression and second portions 1206 being in tension due to a loading force 1208. The structural beam is preferably configured as an I-Beam having an upper flange 1210 in compression, a lower flange 1212 in tension, and a web 1214 connecting the upper flange 1210 to the lower flange 1212. Portions of greatest compression 1216 occur in the upper flange 1210, and portions of greatest tension 1218 occur in the lower flange 1212. It is understood to someone skilled in the art that the beam can have different cross-sectional profiles and not depart from the scope and spirit of the present invention.

The beam profile 1202 has a multiplicity of compressive structural elements 700 disposed in portions of compression 1204. Preferably, the compressive structural elements 700 are of greater incidence in portions of greatest compression 1216. The beam profile 1202 also having a multiplicity of tensile structural elements 800 disposed in portions of tension 1206. Preferably, the tensile structural elements 800 are of greater incidence in portions of greatest tension 1218. The compressive and tensile structural elements 700, 800 provide damping and/or rigidity in response to the loading force.

The structural elements can be configured, as discussed previously, for optimum damping, rigidity, or any combination thereof by varying the wall thickness and/or the type and characteristics of the non-compressible materials.

Figure 13A:
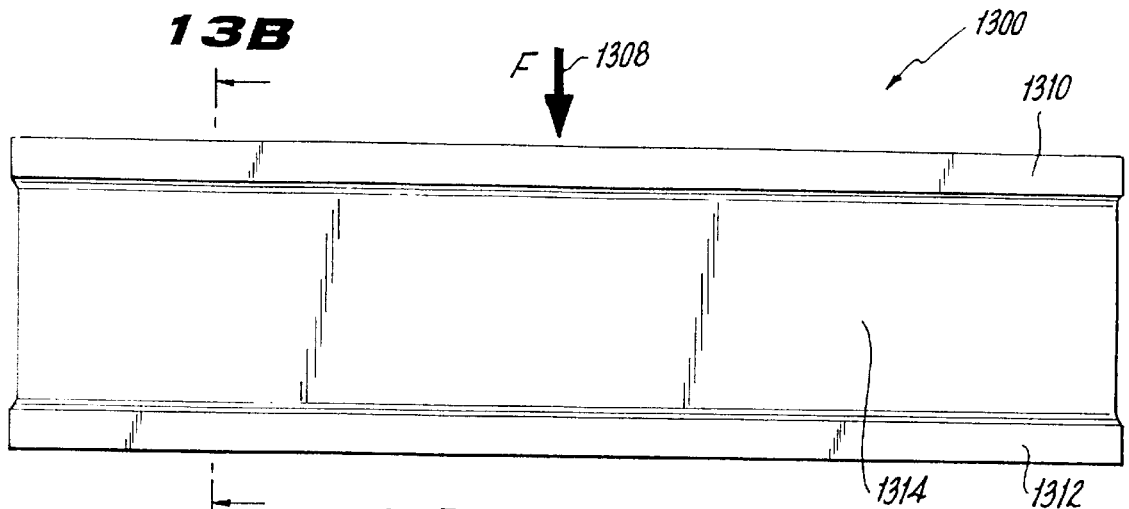
FIG. 13A illustrates a front view of a structural beam wherein structural elements combining the fourth and fifth embodiments of the present invention are disposed throughout the beam's cross-sectional profile.
Figure 13B:
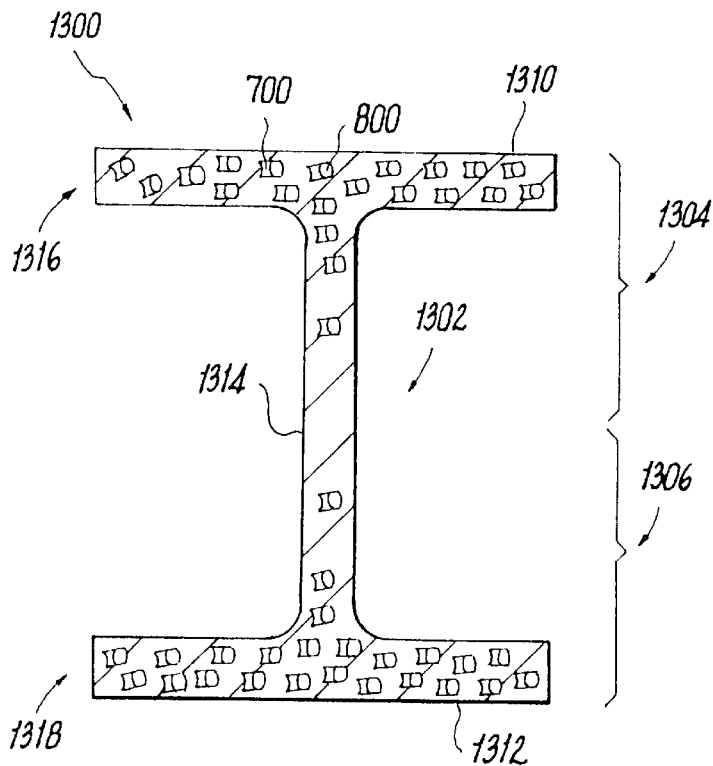
FIG. 13B illustrates a sectional view of the beam of FIG. 13A taken along line 13B—13B.

Referring now to FIGS. 13A and 13B there is illustrated a structural beam generally referred to by reference numeral 1300. The structural beam having a cross-sectional profile 1302, with first portions 1304 of the profile being in compression and second portions 1306 being in tension due to a loading force 1308. The structural beam is preferably configured as an I-Beam having an upper flange 1310 in compression, a lower flange 1312 in tension, and a web 1314 connecting the upper flange 1310 to the lower flange 1312. Portions of greatest compression 1316 occur in the upper flange 1310, and portions of greatest tension 1318 occur in the lower flange 1312. It is understood to someone skilled in the art that the beam can have different cross-sectional profiles and not depart from the scope and spirit of the present invention.

The beam profile 1302 has a multiplicity of compressive and tensile structural elements 700,800 joined together and disposed in portions of compression and tension 1304 and 1306. Preferably, the joined structural elements 700,800 are of greater incidence in portions of greatest compression 1316 and greatest tension 1318.

The joined structural elements 700,800 can be configured, as discussed previously, for optimum damping, rigidity, or any combination thereof by varying the wall thickness and/or the type and characteristics of the non-compressible materials.

The combined structural elements 700,800 provide either damping or added rigidity to the beam as a result of their resistance to the loading force 1308. As discussed previously, the structural elements 700, 800 can be configured for optimum damping, rigidity, or any combination thereof. However, unlike structural beam 1200, structural beam 1300 is equipped to provide damping and/or added rigidity to the loading force 1308 in the direction shown, or a loading force in the opposite direction in which the upper flange 1310 is in tension and the lower flange 1312 is in compression. Structural beam 1300 therefore being more versatile than structural beam 1200 which is utilized in situations where the loading force is known not to vary in direction, or where the damping and/or added rigidity is only desired when the loading force is in a certain direction.

Figure 14A:
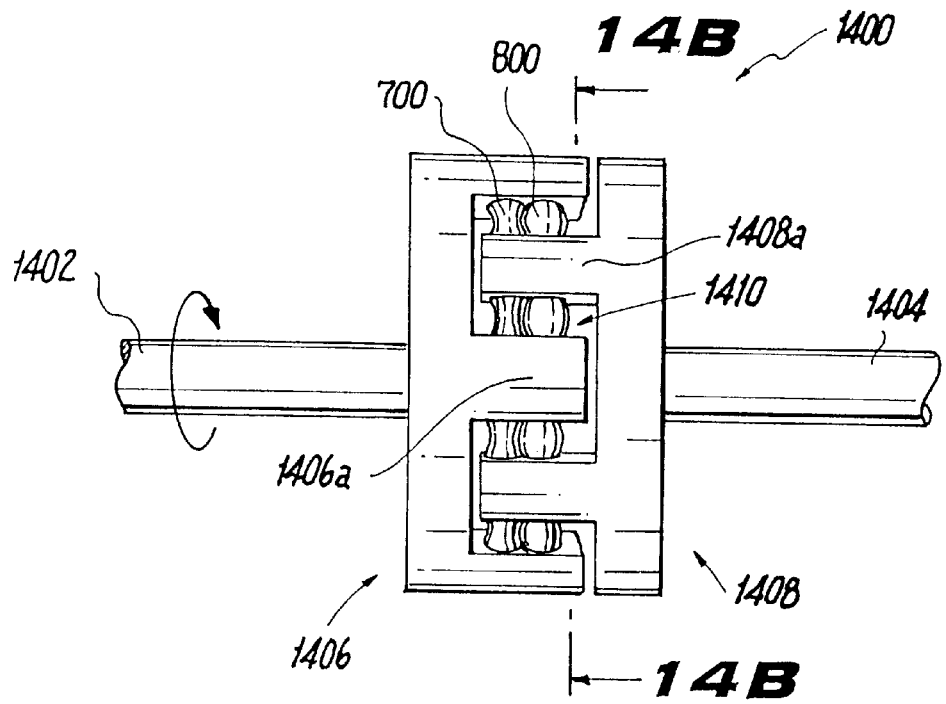
FIG. 14A illustrates a front view of a motion impartation coupling comprising structural elements of the present invention.
Figure 14B:
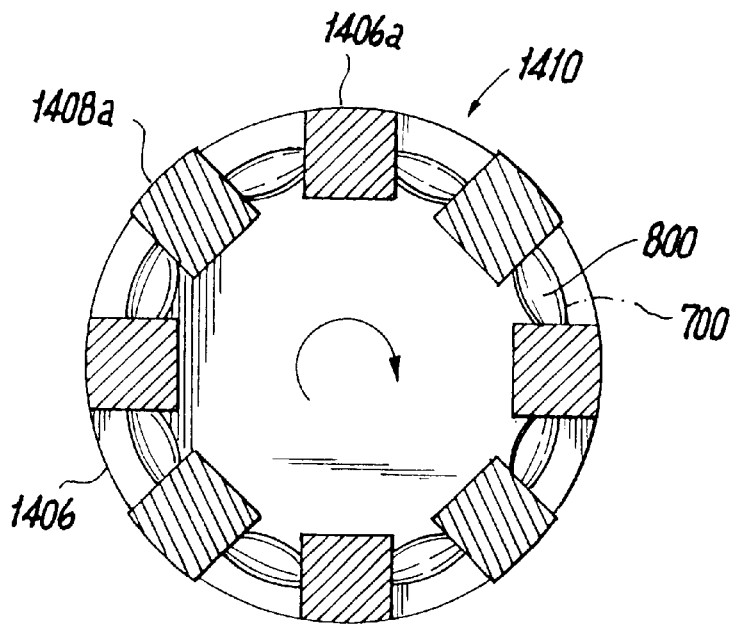
FIG. 14B illustrates a sectional view of the motion impartation coupling of FIG. 14A taken along line 14B—14B.

Further embodiments of the present invention which utilize the compressive and tensile structural elements 700, 800 previously discussed will now be described in relation to motion impartation devices. Referring now to FIGS. 14A and 14B, there is illustrated a coupling 1400 for imparting rotation (and torque) from a driving shaft 1402 to a driven shaft 1404. The driving shaft 1402 is connected to a driving portion 1406 of the coupling 1400 and the driven shaft 1404 is connected to a driven portion 1408 of the coupling 1400.

The driving portion 1406 is engaged with the driven portion 1408 such that a gap 1410 exists between driven and driving portions 1406, 1408. Preferably, the driven and driving portions 1406, 1408 comprise a plurality of teeth 1406a, 1408a which are meshed together with the gap 1410 being between each driving and driven teeth 1406a, 1408a, respectively. Disposed in each gap 1410 is a structural element.

Rotation of the driving portion 1406 results in a compressive force being exerted on the driven portion 1408. In the configuration shown in FIG. 14B, where a plurality of driven and driving teeth 1406a, 1408a are utilized, each driving tooth 1406a exerts a compressive force on the structural element disposed between it and the next driven tooth 1408a in the direction of the rotation. Simultaneously, each driven tooth 1408a exerts a tensile force on the structural element disposed between it and the next driving tooth 1406a in the direction opposite to the direction of rotation. Thus, the structural elements disposed in the gaps 1410 provide damping and/or rigidity in response to the driving rotation (and torque) depending upon the structural element's configuration as previously discussed.

Preferably joined compressive and structural elements 700,800 are disposed in the gaps 1410 for added versatility, i.e, for the desired damping and/or rigidity in either direction of rotation. However, all compressive 700 or all tensile 800 structural elements can be used. However, only half of them would be effectively working in any one direction of rotation, with the other half working in the opposite direction of rotation. Another alternative, is to alternate compressive 700 and tensile 800 elements in the gaps 1410. However, this arrangement can only be used if the direction of rotation is known and if it does not vary.

Figure 15:
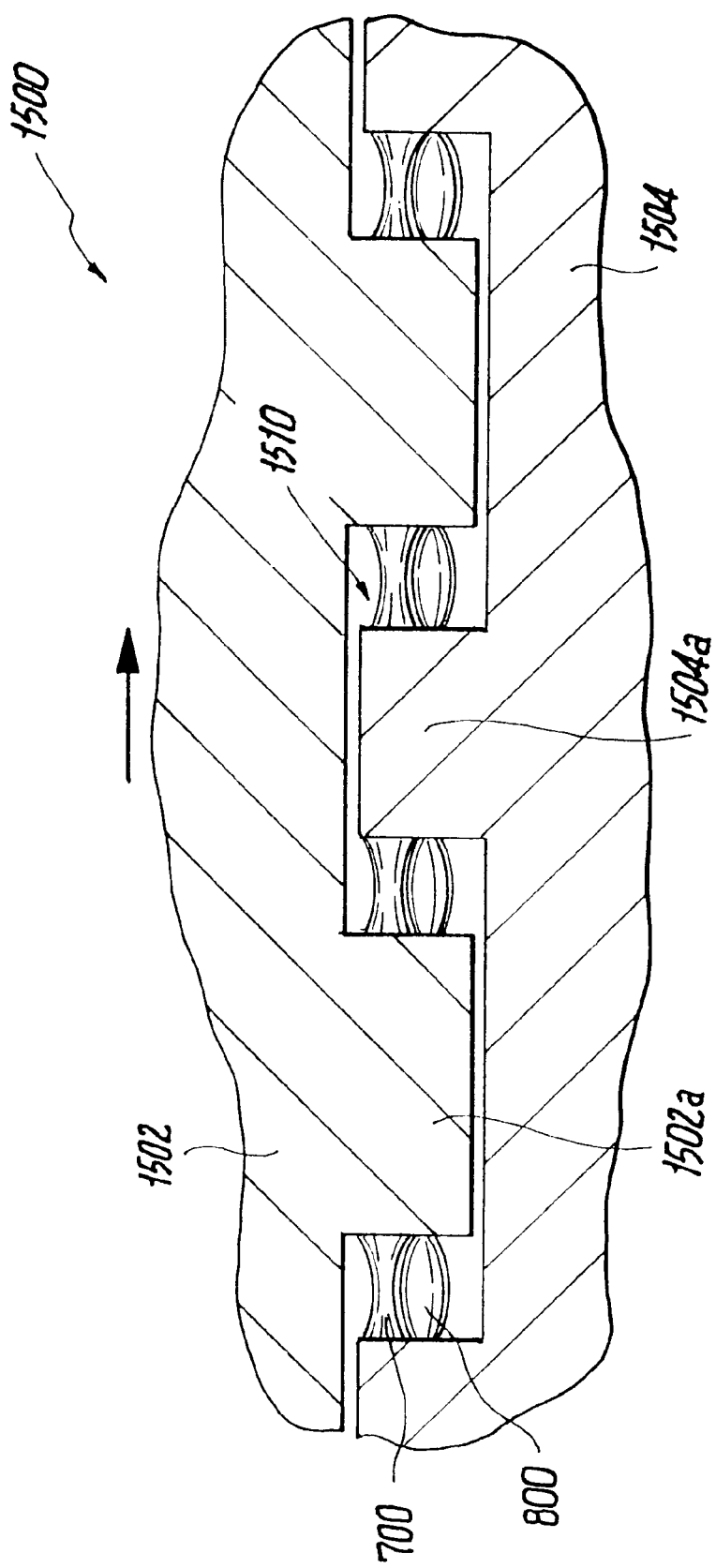
FIG. 15 illustrates a sectional view of a translating motion impartation device comprising structural elements of the present invention.

The motion impartation device previously discussed can also be adapted to provide damping and/or rigidity in response to forces exerted when imparting translation, or linear motion from a driving portion to a driven portion. Such a device is illustrated in FIG. 15 and generally referred to by reference numeral 1500. FIG. 15 illustrates a linear coupling 1500 for imparting motion from a driving portion 1502 to a driving portion 1504. Like the rotational coupling 1400, the driving and driven portions 1502, 1504 preferably comprise driven and driving teeth 1502a, 1504a separated by gaps 1510 in which structural elements are disposed. The remainder of the linear coupling in principle and structure is the same as the rotational coupling 1400 previously described.

Figure 16:
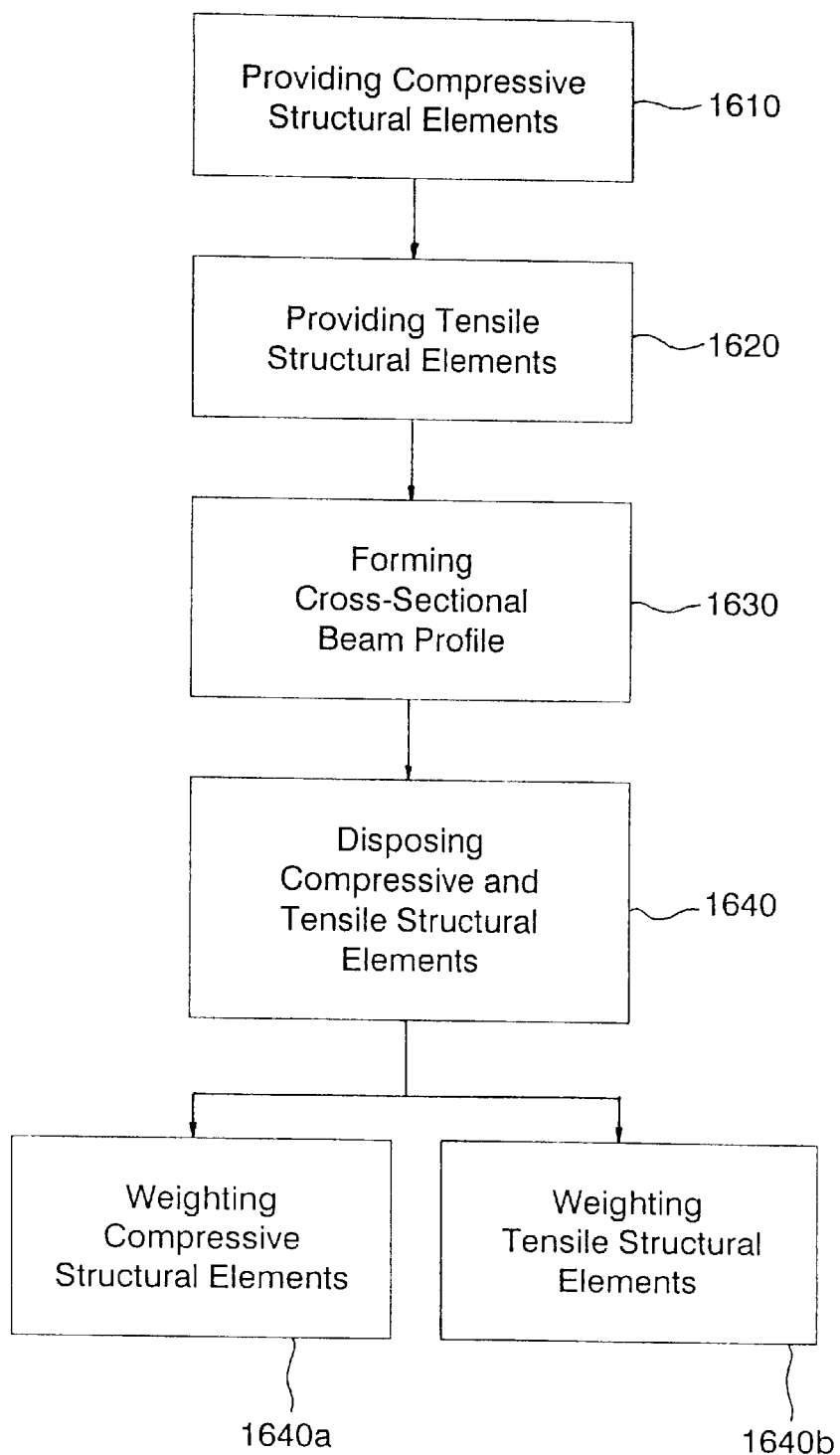
FIG. 16 illustrates a flow diagram outlining the steps for fabricating the structural beam of FIGS. 12A and 12B.

Methods for fabricating the structural beams 1200, 1300 previously discussed will now be described. Illustrated in FIG. 16 is a flow chart showing the steps for fabricating structural beam 1200, the method generally referred to by reference numeral 1600. At step 1610 and 1620, respectively, compressive and tensile structural elements 700, 800 are provided.

Preferably the providing steps 1610, 1620 are accomplished by fabricating the first and second non-compressible material to a shape and size similar to that of the first and second cavities. The non-compressible materials can be fabricated by any conventional means known in the art, such as injection molding. The first and second enclosures are then formed around the non-compressible material by any means known in the art, preferably by either dipping the elastomers into a liquid material to form a shell enclosure or by spraying a molten material onto the non-compressible materials to form a shell. Both of these methods require molten shell materials which have a melting point lower than that of the non-compressible material so that the non-compressible material is not damaged or melted during the enclosure forming process. In a subsequent operation, flectural joints can be created by a stamping operation.

An alternative method for providing 1610, 1620 the compressive and tensile structural elements 700, 800 comprises forming the first and second enclosures and then filling the enclosures with first and second non-compressible materials, respectively. The forming of the enclosures can be done by any means known in the art, such as casting, metal forming, or injection molding. The filling of the enclosures can also be done by any means known in the art, such as by injecting a liquid material into the enclosure and allowing it to solidify.

The next step in the fabrication process 1600 is to form the cross-sectional profile of the beam at step 1630. This is accomplished by conventional processes known in the art, such as by extrusion or casting. Lastly, at step 1640 the multiplicity of compressive and tensile structural elements 700, 800 are disposed throughout the beam cross-section and along the length of the extrusion. Preferably, the disposing step 1640 includes the sub-steps of weighting the greatest incidence of compressive structural elements in portions of greatest compression (step 1640a) and weighting the greatest incidence of tensile structural elements in portions of greatest tension (at step 1640b).

The weighing steps 1640a, 1640b can be accomplished by providing a wax, or similar material, extrusion or cast of the beam and positioning the compressive and tensile structural elements 700, 800 within the wax in areas of greatest compression and greatest tension, respectively. The beam is then cast by adding liquid material, preferably metal, to the cast such that the liquid material replaces the wax and the structural elements remain positioned in the portions of greatest compression and tension. If the structural elements are denser than the wax and the wax is sufficiently soft, then the positioning can be accomplished by inserting the structural elements into the wax and subjecting the wax beam to a centrifugal force such that the centrifugal force exerted on the elements causes them to relocate to positions along the cross-sectional profile corresponding to portions of greatest tension and compression.

Alternatively, the weighting steps 1640a, 1640b can also be accomplished by stringing the compressive structural elements 700 together along an axis parallel to their walls (i.e., top to bottom), stringing the tensile structural elements 800 together in a similar fashion, positioning the element strings in portions of greatest compression and greatest tension, and casting or extruding the beam profile around the element strings such that they remain as positioned. The elements are preferably strung together by wiring the top of an element to a successive bottom of another element. Alternatively, the elements can be welded together.

Figure 17:
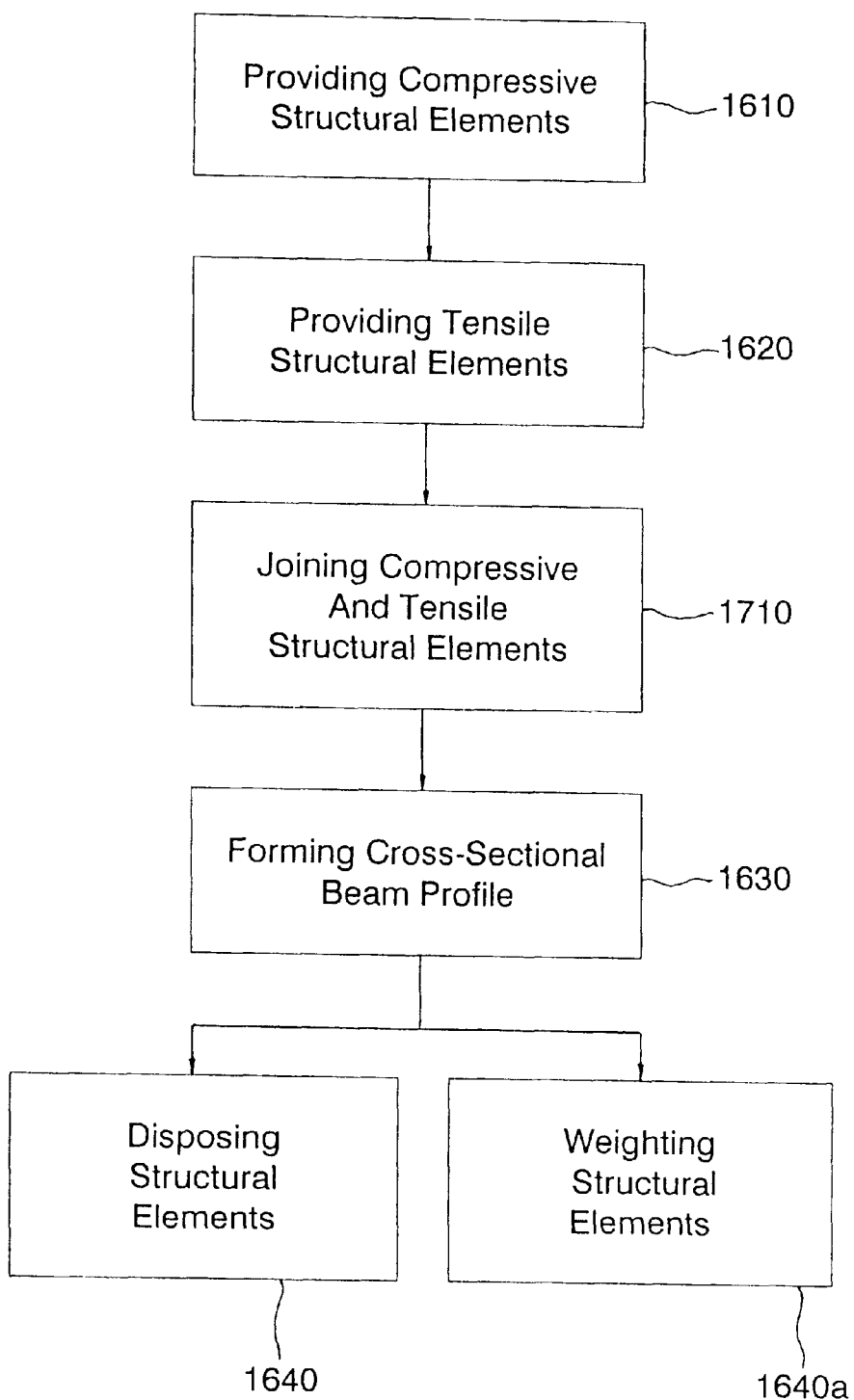
FIG. 17 illustrates a flow diagram outlining the steps for fabricating the structural beam of FIGS. 13A and 13B.

Referring now to FIG. 17, there is illustrated a method for fabricating structural beam 1300 generally referred to by reference numeral 1700. The method illustrated in FIG. 17 in which all steps similar to or identical with those in FIG. 16 are designated with the same reference numerals, is merely modified with regard to the previous method, in that the structural elements 700, 800 are joined at step 1710 to form a combined structural element. The joining is preferably accomplished by welding the structural elements together to form a shared wall.

Also, modified with regard to the previous method is the weighting step which only comprises weighting the combined structural element throughout the beam profile, instead of weighting each structural element as is done in the .previous method. The preferable methods for weighting of the elements and positioning the elements as discussed in the previous method are likewise the same.

From the foregoing, it becomes readily apparent to one skilled in the art that the novel structural elements of the present invention offers increased rigidity and damping over currently employed devices. Due to the inventive structural element configuration, the advantages offered by the inventive structure resides in:

(a) because the walls of the structural elements can be made relatively thin, and because the non-compressible material is relatively lightweight, the structural element can be made very lightweight;

(b) because of the novel configuration whereby the non-compressible material resists any loading forces, the structural element can be configured for high rigidity;

(c) because of the novel configuration, the structural element can also provide high internal damping by configuring the walls to provide for an increased migration of non-compressible material within the cavity; and (d) because of its lightweight, high rigidity, and high internal damping characteristics, the structural element of the present invention provides a reliable, low cost alternative to active damping devices.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

I claim:

1. A structural beam comprising;

an upper surface in one of compression or tension due to a loading force;

a lower surface in the other of compression or tension due to the loading force;

means for connecting the upper surface to the lower surface; and a plurality of structural elements disposed along the length of the upper and lower surfaces, each structural element comprising a compressive and a tensile structural element, the compressive structural element having a first enclosure having first walls surrounding a first cavity, the tensile structural element having a second enclosure having second walls surrounding a second cavity, a first non-compressible material disposed in the first cavity, and a second non-compressible material disposed in the second cavity, wherein the first walls are shaped such that the loading force tends to compress the structural element by a first deflection causing an amplified second deflection of the first walls into the first non-compressible material, exerting a first compressive force against the first non-compressible material, resulting in a resistance to the first deflection and the loading force, and wherein the second walls are shaped such that the loading force tends to elongate the structural element by a third deflection causing an amplified fourth deflection of the second walls into the second non-compressible material, exerting a second compressive force against the second non-compressible material, resulting in a resistance to the third deflection and the loading force.

2. The structural beam of claim 1, wherein the shape of the beam is an I-beam and the means for connecting the upper and lower surfaces is a web.

3. The structural beam of claim 1, wherein the first and second walls are of a uniform thickness such that the second and fourth deflections causes minimal migration of the first and second non-compressible materials, respectively.

4. The structural beam of claim 1, wherein the first and second walls gradually become thicker at the center of the first and second cavities, such that the second and fourth deflections causes increased migration of the first and second non-compressible materials, respectively.

5. The structural beam of claim 1, wherein at least one of the first and second non-compressible materials is an elastomer.

6. The structural beam of claim 1, wherein at least one of the first and second non-compressible materials is a liquid.

7. The structural beam of claim 1, wherein at least one of the first and second non-compressible materials is a combination of elastomer and liquid.

\* \* \* \* \*